(12) United States Patent
McBryde et al.

(10) Patent No.: US 10,581,313 B2
(45) Date of Patent: Mar. 3, 2020

(54) HYBRID I-T TYPE MULTI-LEVEL CONVERTERS

(71) Applicant: Eaton Intelligent Power Limited, Dublin (IE)

(72) Inventors: James Andrew McBryde, Wake Forest, NC (US); Swanand Juvekar, Morrisville, NC (US)

(73) Assignee: Eaton Intelligent Power Limited (IE)

( * ) Notice: Subject to any disclaimer, the term of this patent is extended or adjusted under 35 U.S.C. 154(b) by 0 days.

(21) Appl. No.: 15/907,547

(22) Filed: Feb. 28, 2018

(65) Prior Publication Data

US 2019/0267889 A1    Aug. 29, 2019

(51) Int. Cl.
*H02M 1/088*    (2006.01)
*H02M 7/483*    (2007.01)
(Continued)

(52) U.S. Cl.
CPC .......... *H02M 1/088* (2013.01); *H02M 7/483* (2013.01); *H02M 7/537* (2013.01); *H02M 7/797* (2013.01); *H02M 7/487* (2013.01)

(58) Field of Classification Search
CPC .............. H02M 1/088; H02M 7/537; H02M 2001/0054; H02M 7/797; H02M 7/483;
(Continued)

(56) References Cited

U.S. PATENT DOCUMENTS 6,005,787 A * 12/1999 Mizukoshi ............ H02M 7/483
307/44
6,226,192 B1 * 5/2001 Yamanaka ............... H02M 1/34
363/56.01
(Continued)

FOREIGN PATENT DOCUMENTS

CN    202949375 U    5/2013
CN    104038090    9/2014
(Continued)

OTHER PUBLICATIONS

Salem et al, "Evaluation of a Dual-T-Type Converter Supplying an Open-End Winding Induction Machine," 39th Annual Conference of the IEEE Industrial Electronics Society, IECON 2013, Nov. 2013, 6 pages.
(Continued)

*Primary Examiner* — Nguyen Tran
*Assistant Examiner* — Demetries A Gibson
(74) *Attorney, Agent, or Firm* — Stanek Lemon Crouse & Meeks, P.A.

(57) ABSTRACT

A multi-level converter includes a plurality of capacitors coupled in series between first and second nodes of a DC port and coupled to one another at n-2 first intermediate nodes. The converter also includes a switching circuit including at least one first switch configured to couple the first node of the DC port to an input/output node, at least one second switch configured to couple the second node of the DC port to the input/output node, and at least three third switches configured to couple respective ones of the first intermediate nodes to the input/output node. The converter further includes a control circuit configured to control the first, second and third switches to provide an n-level converter.

4 Claims, 17 Drawing Sheets

(51) Int. Cl.
*H02M 7/797* (2006.01)
*H02M 7/537* (2006.01)
*H02M 7/487* (2007.01)

(58) Field of Classification Search
CPC ......... H02M 7/487; H02M 2001/0067; H02M 2001/0074; H02M 2001/0077; H02M 2001/008; H02M 2001/007
See application file for complete search history.

(56) References Cited

U.S. PATENT DOCUMENTS

| | | |
|---|---|---|
| 6,757,185 B2 | 6/2004 | Rojas Romero |
| 6,930,899 B2 | 8/2005 | Bakran et al. |
| 8,513,928 B2 | 8/2013 | Totterman et al. |
| 9,129,824 B2 | 9/2015 | Laschek-Enders |
| 9,148,069 B2* | 9/2015 | Gupta ................... H02M 7/483 |
| 9,413,268 B2 | 8/2016 | Fu et al. |
| 9,419,541 B2 | 8/2016 | Yoo |
| 2013/0301314 A1* | 11/2013 | Fu ........................ H02M 7/487 363/37 |
| 2014/0292089 A1* | 10/2014 | Tamai ................... H02M 7/487 307/82 |
| 2015/0131348 A1* | 5/2015 | Rasoanarivo ....... H02M 5/4585 363/123 |
| 2015/0131349 A1* | 5/2015 | El-Barbari ............ H02M 1/088 363/131 |
| 2015/0200602 A1* | 7/2015 | Narimani ............. H02M 5/4585 363/37 |
| 2017/0117820 A1* | 4/2017 | Goto ..................... H02M 7/487 |
| 2018/0131290 A1* | 5/2018 | Ng ........................ H02M 7/501 |

FOREIGN PATENT DOCUMENTS

| | | |
|---|---|---|
| CN | 104038090 A | 9/2014 |
| EP | 2 251 969 A1 | 11/2010 |
| JP | 2007-0028870 A | 2/2007 |
| WO | WO03/005551 | 1/2003 |

OTHER PUBLICATIONS

International Search Report and Written Opinion of the International Searching Authority, or the Declaration; PCT/EP2019/025054; dated May 31, 2019; 11 pages.

* cited by examiner

HYBRID I-T TYPE MULTI-LEVEL CONVERTERS

BACKGROUND

The inventive subject matter relates to power converters and, more particularly, to multi-level power converters.

Multi-level converters are commonly used in applications such uninterruptible power supplies (e.g., for an inverter and/or rectifier), grid-tie converters, motor drive inverters, and the like. Multi-level inverters drive an output at a greater number of different voltage levels than the two output voltage levels provided by a traditional two-level inverter. Typical multi-level inverters use multiple switches (e.g., transistors and parallel-connected diodes) in series, such that each device typically sees less voltage stress in comparison to devices in a two-level converter.

There are various different circuit topologies that can be used to implement a multi-level inverter. For example, FIG. 1 illustrates a conventional 3-level "I" type multi-level converter including upper and lower switch branches including respective insulated gate bipolar transistors (IGBTs) IGBT1, IGBT2, IGBT3, IGBT4, coupled to positive and negative DC buses V+, V− and to an energy storage circuit including an inductor L and a capacitor C. Diodes D1, D2, D3, D4 are coupled across respective ones of the transistors IGBT1, IGBT2, IGBT3, IGBT4. Neutral clamping diodes D5 and D6 couple respective ones of intermediate nodes N1, N2 to a neutral N. Capacitors C1 and C2 are coupled between respective ones of the DC buses V+, V− and the neutral N. FIG. 2 illustrates a conventional 5-level I-type multi-level converter including upper switch branches including transistors IGBT1, IGBT2, IGBT3 IGBT4 and parallel-connected diodes D1, D2, D3, D4, lower switch branches including transistors IGBT5, IGBT6, IGBT7, IGBT8 and parallel-connected diodes D5, D6, D7, D8, clamping diodes D9, D10, D11, D12, D13, D14 and capacitors C1, C2, C3, C4. FIG. 3 illustrates a conventional "T" type multi-level converter, including upper and lower switch branches including transistors IGBT1, IGBT4 and parallel-connected diodes, a neutral clamping switch branch including transistors IGBT2, IGBT3 and parallel-connected diodes D3, D4, and capacitors C1, C2.

SUMMARY

Some embodiments of the inventive subject matter provide a multi-level converter including a plurality of capacitors coupled in series between first and second nodes of a DC port and coupled to one another at n-2 first intermediate nodes. The converter also includes a switching circuit including at least one first switch configured to couple the first node of the DC port to an input/output node, at least one second switch configured to couple the second node of the DC port to the input/output node, and at least three third switches configured to couple respective ones of the first intermediate nodes to the input/output node. The converter further includes a control circuit configured to control the first, second and third switches to provide an n-level converter.

In some embodiments, the at least one first switch may include two switches coupled in series between the first node of the DC port and the input/output node and coupled to one another at a second intermediate node and the at least one second switch may include two switches coupled in series between the second node of the DC port and the input/output node and coupled to one another at a third intermediate node. The at least three third switches may include two third switches coupled in series between a first one of the first intermediate nodes and the input/output node and two switches configured to couple respective second ones of the first intermediate nodes to respective ones of the second and third intermediate nodes.

In further embodiments, the at least one first switch may include a switch configured to couple the first node of the DC port to the input/output node. The at least one second switch may include a switch configured to couple the second node of the DC port to the input/output node. The at least three third switches may include two switches coupled in series between a first one of the first intermediate nodes and the input/output node, two switches coupled in series between a second one of the first intermediate nodes and the input/output node, and two switches coupled in series between a third one of the first intermediate nodes and the input/output node. The at least one first switch may include two switches coupled in series between the first node of the DC port and the input/output node and the at least one second switch may include two switches coupled in series between the second node of the DC port and the input/output node. The switching circuit may further include two switches coupled in series between a fourth one of the first intermediate nodes and a second intermediate node between the two switches coupled in series between the first node of the DC port and the input/output node and two switches coupled in series between a fifth one of the intermediate nodes and third intermediate node between the two switches coupled in series between the second node of the DC port and the input/output node.

Additional embodiments provide a multi-level converter including a plurality of capacitors coupled in series between first and second nodes of a DC port and coupled to one another at intermediate nodes. The converter further includes a switching circuit including a first switch branch coupled between the first node of the DC port and an input/output node, a second switch branch coupled between the second node of the DC port and the input/output node, a third switch branch coupled between a first one of the intermediate nodes and the input/output node, a fourth switch branch coupled between a second one of the intermediate nodes and the input/output node, and a fifth switch branch coupled between a third one of the intermediate nodes and the input/output node. The third, fourth and fifth switch branches may each include at least two switches coupled in series and the first and second switch branches each may include a single switch. The switches may include respective transistors with respective diodes coupled in parallel therewith. The switches of the fourth and fifth switch branches may have a first voltage rating greater than a second voltage rating of the switches of the third switch branch, and the switches of the first and second switch branches may have the first voltage rating. The converter may further include a controller configured to operate the first, second, third, fourth and fifth switch branches to produce an AC voltage.

Still further embodiments provide a multi-level converter including a plurality of capacitors coupled in series between first and second nodes of a DC port and coupled to one another at first intermediate nodes. The converter further includes a switching circuit including first and second switch branches coupled in series between the first node of the DC port and an input/output node and coupled to one another at a second intermediate node, third and fourth switch branches coupled in series between the second node of the DC port and the input/output node and coupled to one another at a third intermediate node, a fifth switch branch coupled between a first one of first intermediate nodes and the input/output node, a sixth switch branch coupled between a second one of the first intermediate nodes and the second intermediate node, and a seventh switch branch coupled between a third one of the first intermediate nodes and the third intermediate node. The fifth switch branch may include two switches coupled in series, and the first, second, third, fourth, sixth and seventh switch branches may each include a single switch. The switches may include respective transistors with respective diodes coupled in parallel therewith. The switches of one of first, fourth, fifth, sixth and seventh switch branches may have a first voltage rating less than a second voltage rating of the switches of the second and third switch branches. The converter may further include a controller configured to operate the first, second, third, fourth, fifth, sixth and seventh switch branches to produce an AC voltage.

DETAILED DESCRIPTION

Figure 1:
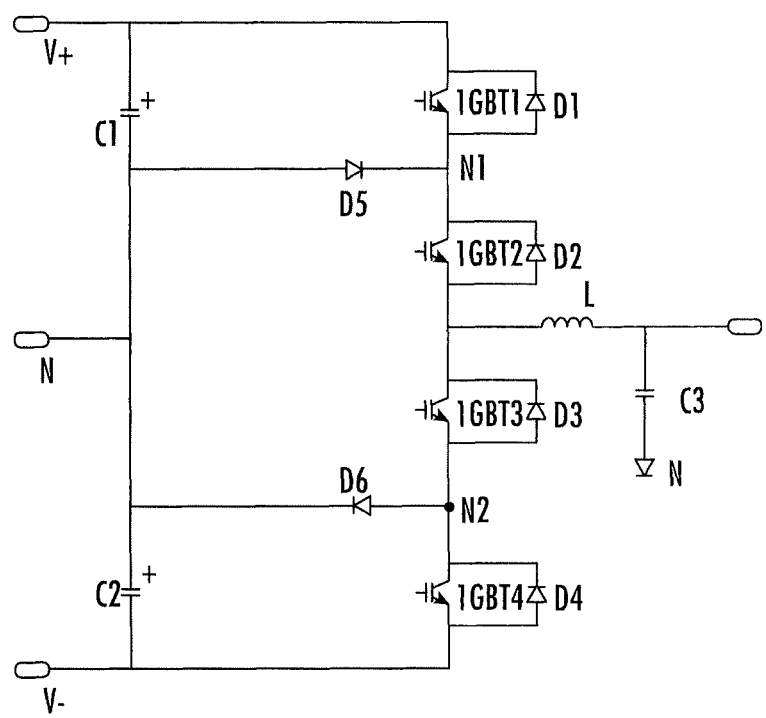
FIG. 1 is a schematic diagram illustrating a conventional I-type 3-level converter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein. As used herein, a "switch branch" refers to a circuit portion between first and second circuit nodes that includes at least one switch, which may include, for example, active semiconductor switches, such as transistors (e.g., IGBTs, MOSFETs, etc.), and associated components that provide desired commutation characteristics, such as diodes.

Some embodiments of the inventive subject matter provide multi-level inverters having unconventional circuit arrangements, including hybrid "I-T" arrangements. These circuits can provide desirable characteristics, such as lower conduction losses. Some embodiments provide methods of operating such circuit arrangements wherein current is directed through selected sets of switch branches based on the current output or input voltage level, which can allow the number of switching devices through which current is passed to be reduced in comparison to conventional multi-level converter designs and operating methods, which can result in reduced conduction losses and other benefits.

Figure 4:
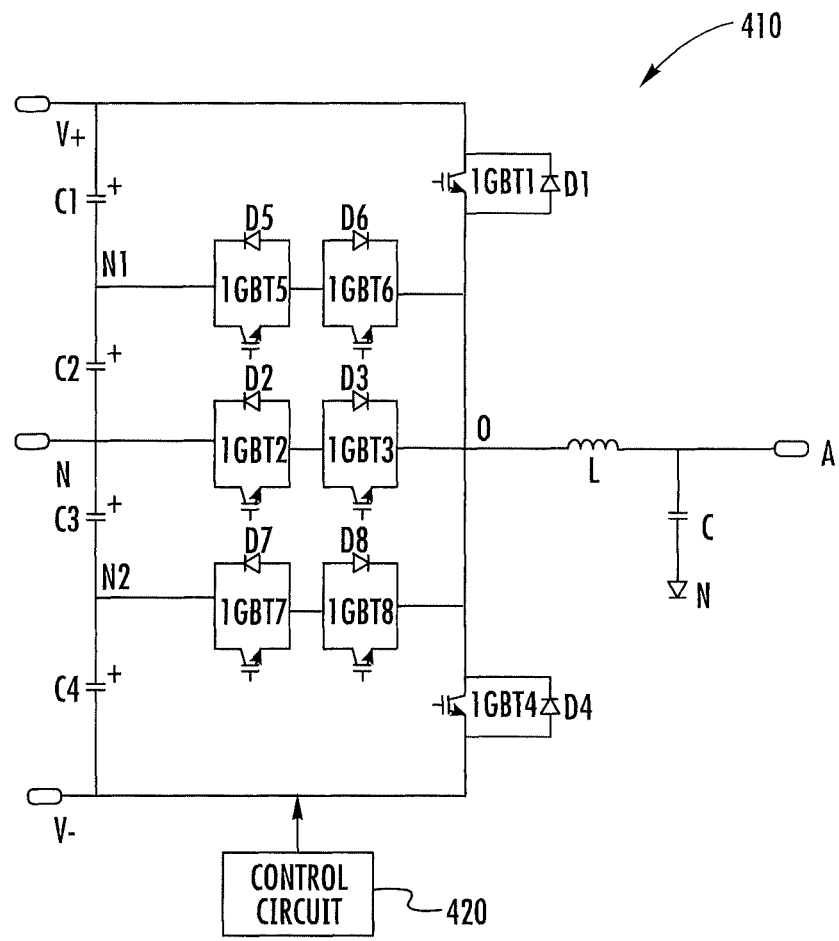
FIG. 4 is schematic diagram illustrating a 5-level converter according to some embodiments.

FIG. 4 illustrates a 5-level converter according to some embodiments. The converter includes capacitors C1, C2, C3, C4 coupled in series between positive and negative voltage buses V+, V− and connected to one another at intermediate nodes, including a neutral N and first and second intermediate nodes N1, N2. A switching circuit 410 includes first and second switch branches coupled between respective ones of the positive and negative voltage buses V+, V− and a input/output node O, here shown as connected to an energy storage circuit including an inductor L and a capacitor C that is coupled to an AC node A. The first switch branch includes a first transistor IGBT1 and a parallel-connected diode D1 and the second switch branch includes a second transistor IGBT4 and a parallel-connected diode D4.

A third switch branch including serially-connected IGBTs IGBT2, IGBT3 and associated diodes D2, D3 is coupled between the neutral N and the input/output node O. A fourth switch branch including serially-connected transistors IGBT5, IGBT6 and associated diodes D5, D6 is coupled between the first intermediate node N1 and the input/output node O. A fifth switch branch including serially-connected transistors IGBT7, IGBT8 and associated diodes D7, D8 is coupled between the second intermediate node N2 and the input/output node O.

The transistors IGBT1, IGBT2, IGBT3, IGBT4, IGBT5, IGBT6, IGBT7, IGBT8 are controlled by a control circuit 420. It will be appreciated that the converter of FIG. 4 is capable of four quadrant operation and that an AC voltage at a converter AC node A may be an AC voltage produced by the converter when it is operating as an inverter or an AC voltage applied to the AC node A when the converter is operating as a rectifier to generate a DC voltage between the positive and negative voltage buses V+, V−.

Figure 5:
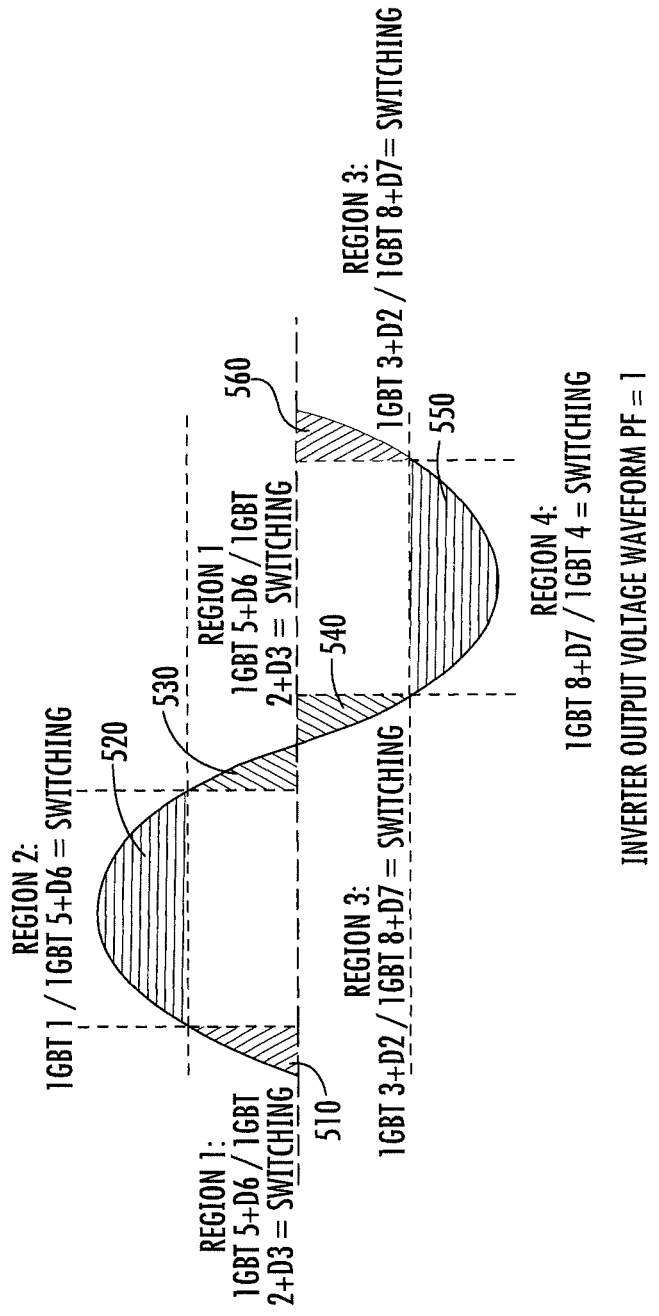
FIG. 5 is a waveform diagram illustrating operations of the 5-level converter of FIG. 4 according to some embodiments.
Figure 6:
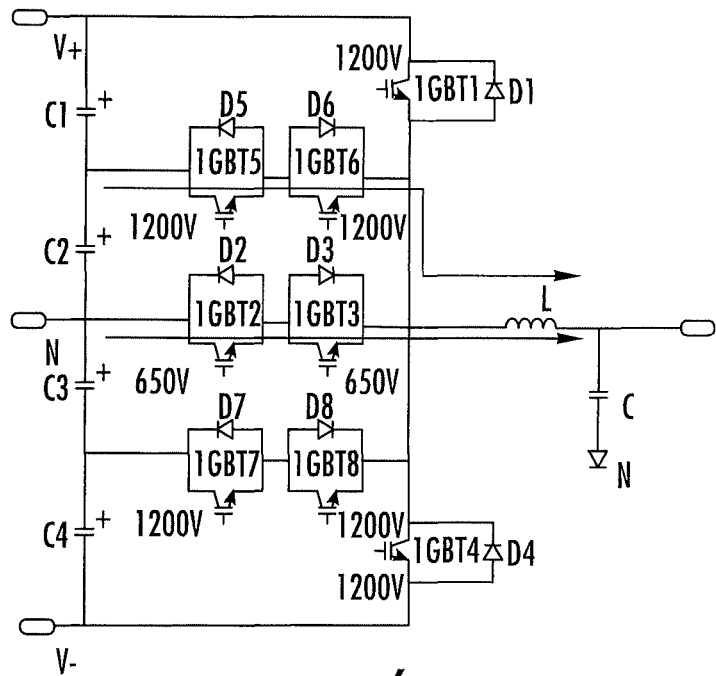
FIGS. 6-9 are schematic diagrams illustrating current flows for the operations of FIG. 5.
Figure 7:
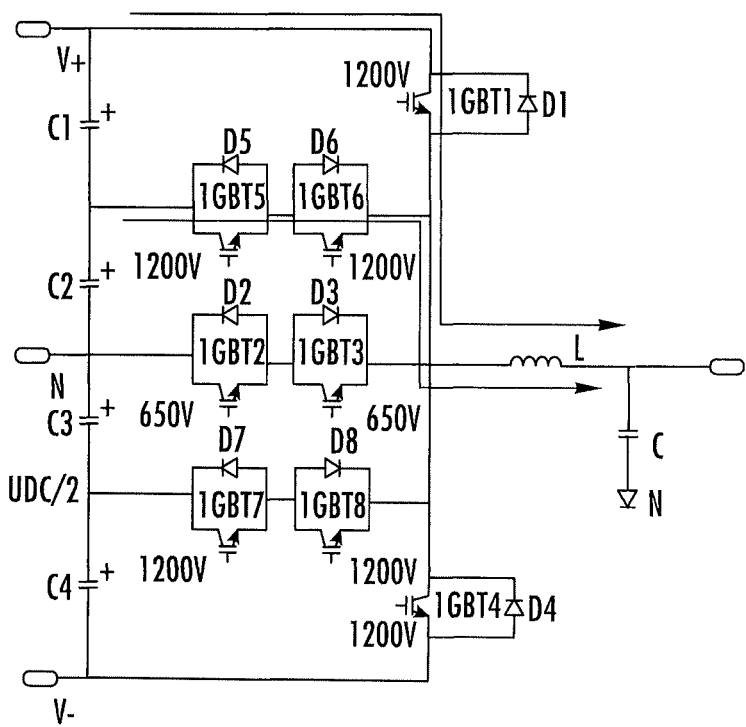

FIGS. 5-9 illustrate operational modes of the converter of FIG. 4 for various portions of an AC voltage waveform at the AC node A. Referring to FIGS. 5 and 6, in a first operational region 510 when the AC voltage is rising but below a positive threshold level, transistors IGBT5, IGBT2 of the fourth and third switch branches are modulated (e.g., pulse-width modulated) to conduct current therethrough. In this mode, the diode D6 connected across the transistor IGBT6 conducts in concert with the transistor IGBT5 and the diode D3 connected across the transistor IGBT3 conducts in concert with the transistor IGBT2. Referring to FIGS. 5 and 7, in a second operational region 520 when the AC voltage has risen above the first threshold, the transistors IGBT1 and IGBT5 of the first and fourth switch branches are modulated such that these branches conduct current. In a third operational region 530 when the voltage is again below the positive threshold level, the transistors IGBT5, IGBT2 of the fourth and third switch branches are again operated as in the first operational region 510.

Figure 8:
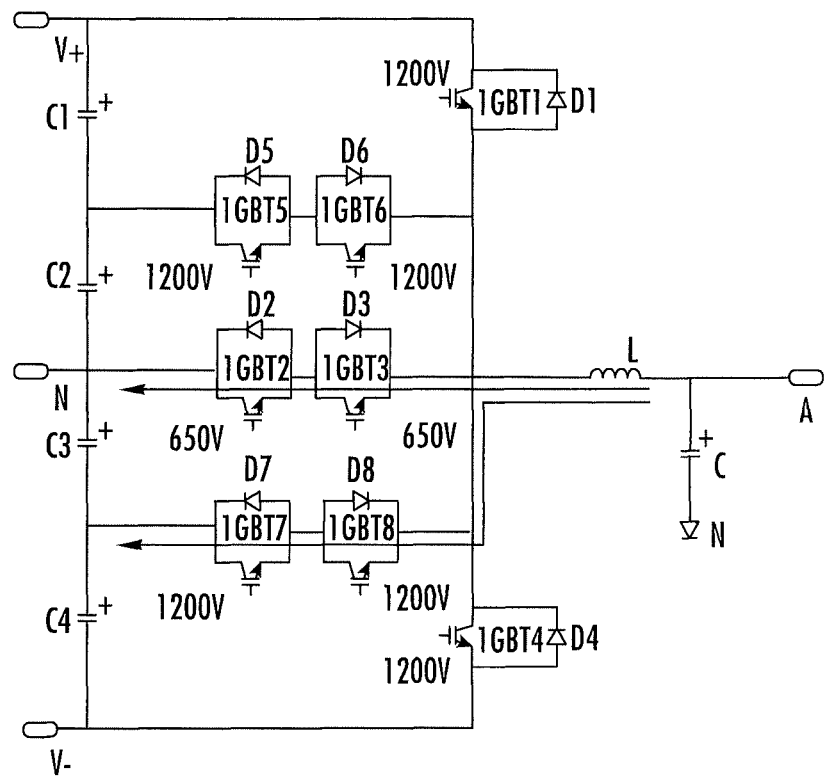
Figure 9:
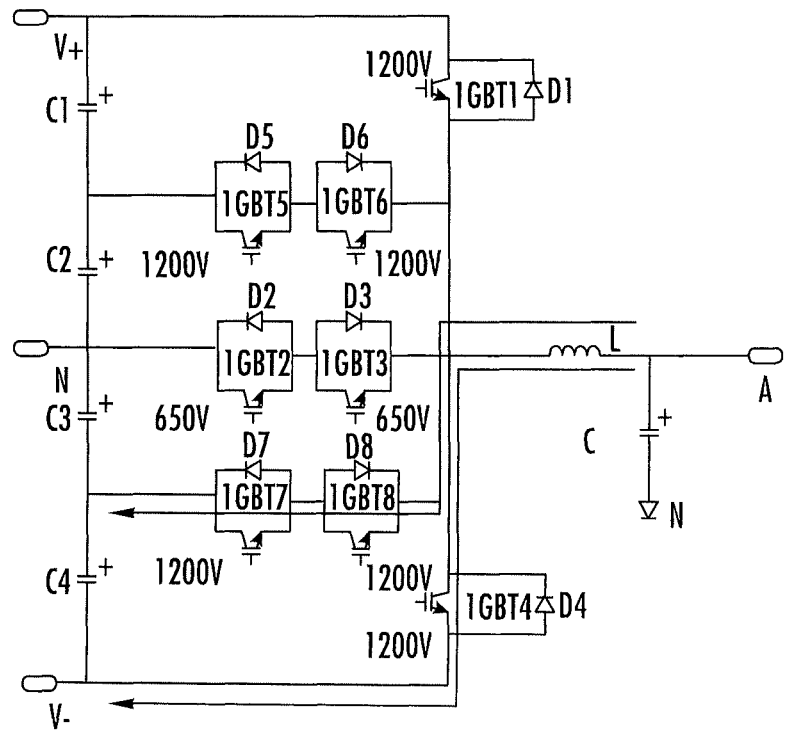

Referring to FIGS. 5 and 8, in a fourth operational region 540 wherein the AC voltage is negative and is above a negative threshold, transistors IGBT3, IGBT8 of the third and fifth switch branches are modulated to conduct current therethrough. In this mode, the diode D2 connected across the transistor IGBT2 conducts in concert with the transistor IGBT3, and the diode D7 connected across the transistor IGBT7 conducts in concert with the transistor IGBT6. Referring to FIGS. 5 and 9, in a fifth operational region 550 in which the voltage falls below the negative threshold, transistors IGBT8 and IGBT4 of the fifth and second switch branches are modulated to conduct current therethrough. In a sixth operational region 560 when the voltage increases above the negative threshold, the transistors IGBT3, IGBT8 of the third and fifth switch branches are again operated as in the fourth operational region 540.

Figure 2:
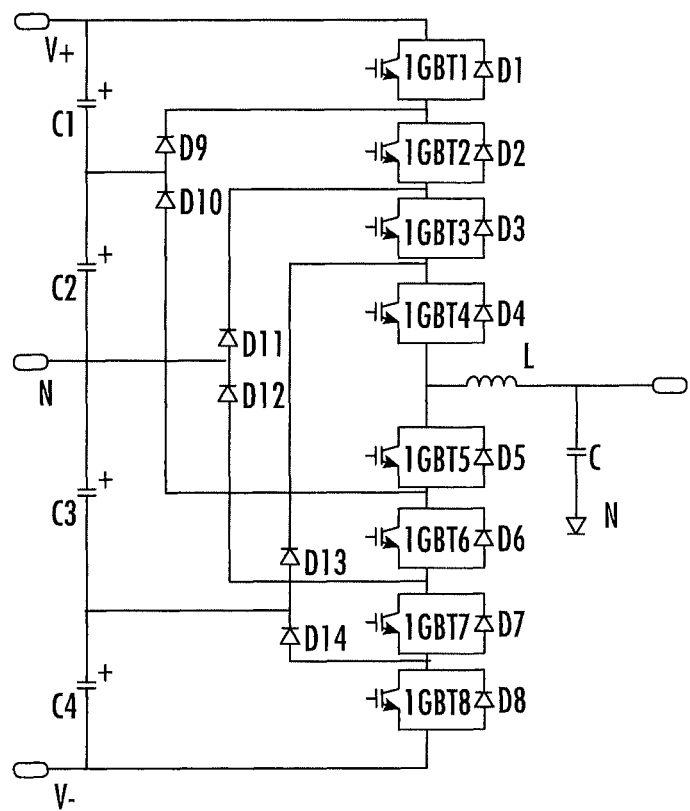
FIG. 2 is a schematic diagram illustrating a conventional I-type 5-level converter.
Figure 3:
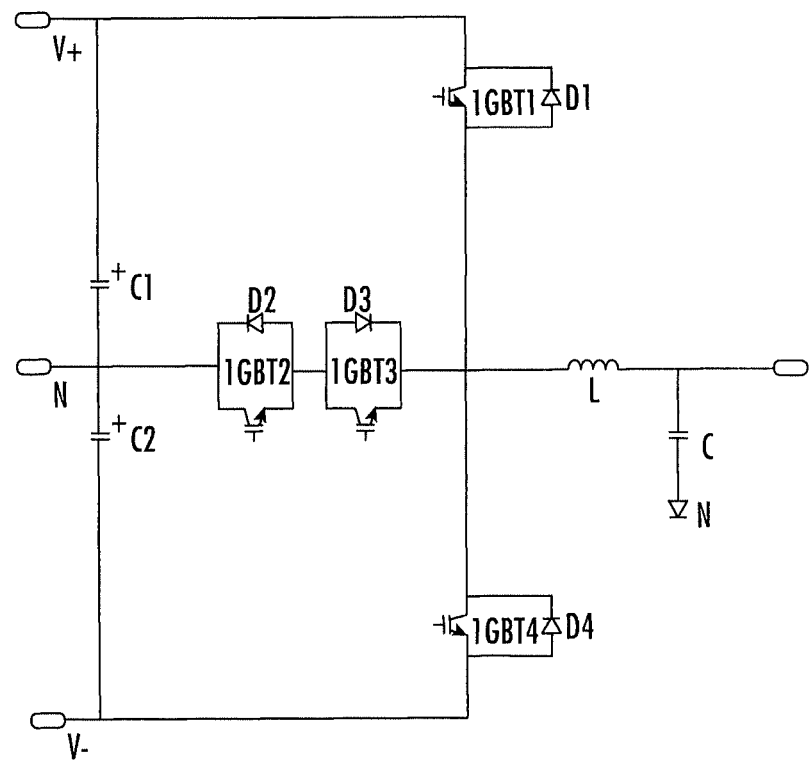
FIG. 3 is schematic diagram illustrating a conventional T-type 3-level converter.

As shown in FIGS. 6-9, in each of these operational modes, current flows through no more than two transistors in series. This can result in reduced losses in comparison to conventional 5-level inverter designs, such as the one illustrated in FIG. 2, in which current may flow through as many as four transistors in series. FIGS. 6-9 also illustrate example voltage ratings for the transistors IGBT1, IGBT2, IGBT3, IGBT4, IGBT5, IGBT6, IGBT7, IGBT8. As shown, the transistors IGBT1, IGBT4, IGBT5, IGBT6, IGBT7, IGBT8 of the first, second, fourth and fifth switch branches may require a higher voltage rating than the voltage rating for the transistors of the "I" type 5-level converter of FIG. 5, but this requirement may be met by using, for example, silicon carbide (SiC) devices, and the advantages of the reduced switching losses may in general outweigh the disadvantages (e.g., cost) of requiring devices with a greater voltage rating.

Figure 10:
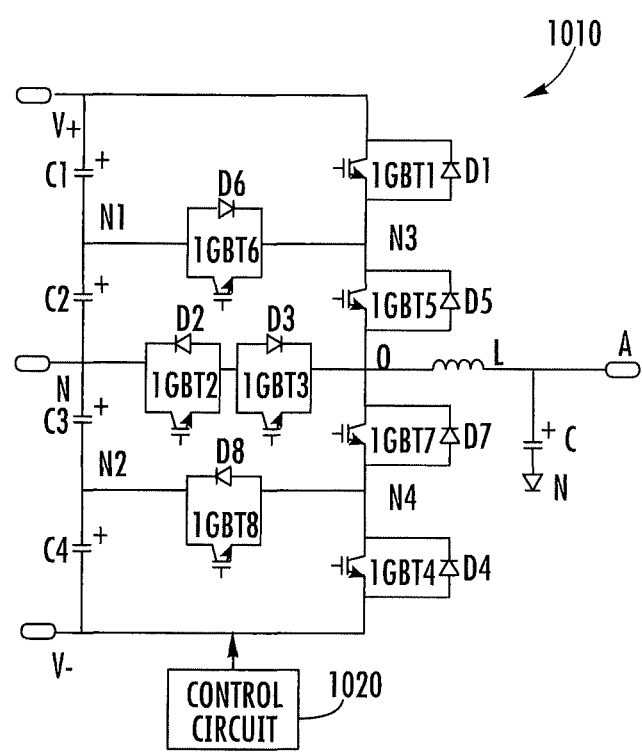
FIG. 10 is a schematic diagram illustrating a 5-level converter according to further embodiments.

FIG. 10 illustrates a 5-level converter according to further embodiments. The converter includes capacitors C1, C2, C3, C4 coupled in series between positive and negative voltage buses V+, V− and connected to one another at intermediate nodes, including a neutral N and first and second intermediate nodes N1, N2. A switching circuit 1010 includes first and second switch branches coupled in series between the positive voltage bus V+ and a input/output node O, here shown as connected to an energy storage circuit including an inductor L and a capacitor C that is coupled to an AC node A. The first and second switch branches include respective transistors IGBT1, IGBT5 and associated diodes D1, D5 and are connected to one another at an intermediate node N3. Third and fourth switch branches are coupled in series between the negative voltage bus V− and the input/output node O. The third and fourth switch branches include respective transistors IGBT7, IGBT4 and associated diodes D7, D4 and are connected to one another at an intermediate node N4.

A fifth switch branch is coupled between the neutral N and the input/output node O and includes serially-connected transistors IGBT2, IGBT3 and respective diodes D2, D3 connected in parallel therewith. A sixth switch branch is coupled between the upper left intermediate node N1 and the upper right intermediate node N3 and includes a transistor IGBT6, which has a diode D6 connected thereacross. A seventh switch branch is coupled between the lower left intermediate node N2 and the lower right intermediate node N4 and includes a transistor IGBT8, which has a diode D8 connected thereacross.

The transistors IGBT1, IGBT2, IGBT3, IGBT4, IGBT5, IGBT6, IGBT7, IGBT8 are controlled by a control circuit 1020. It will be appreciated that the converter of FIG. 10 is capable of four quadrant operation and that an AC voltage at a converter AC node A may be an AC voltage produced by the converter when it is operating as an inverter or an AC voltage applied to the AC node A when the converter is operating as a rectifier to generate a DC voltage between the positive and negative voltage buses V+, V−.

Figure 11:
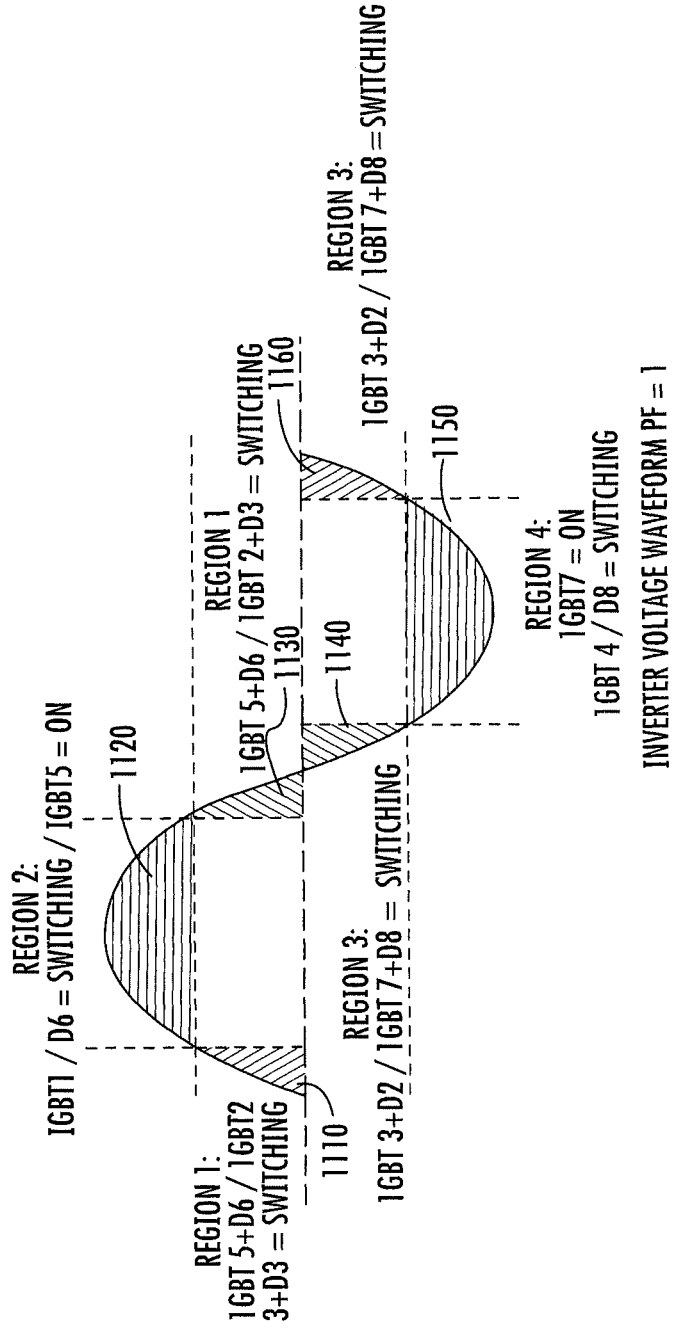
FIG. 11 is a waveform diagram illustrating operations of the 5-level converter of FIG. 10 according to some embodiments.
Figure 12:
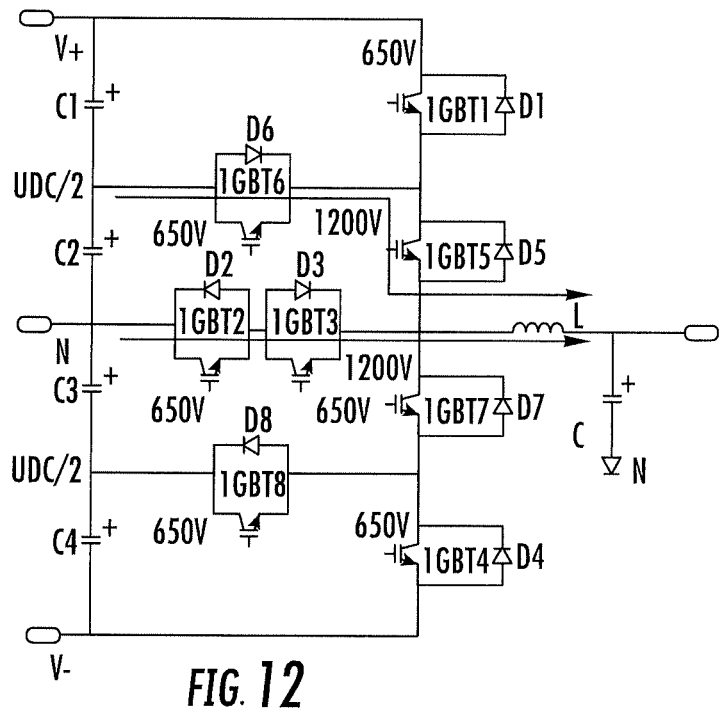
FIGS. 12-15 are schematic diagrams illustrating current flows for the operations of FIG. 11.
Figure 13:
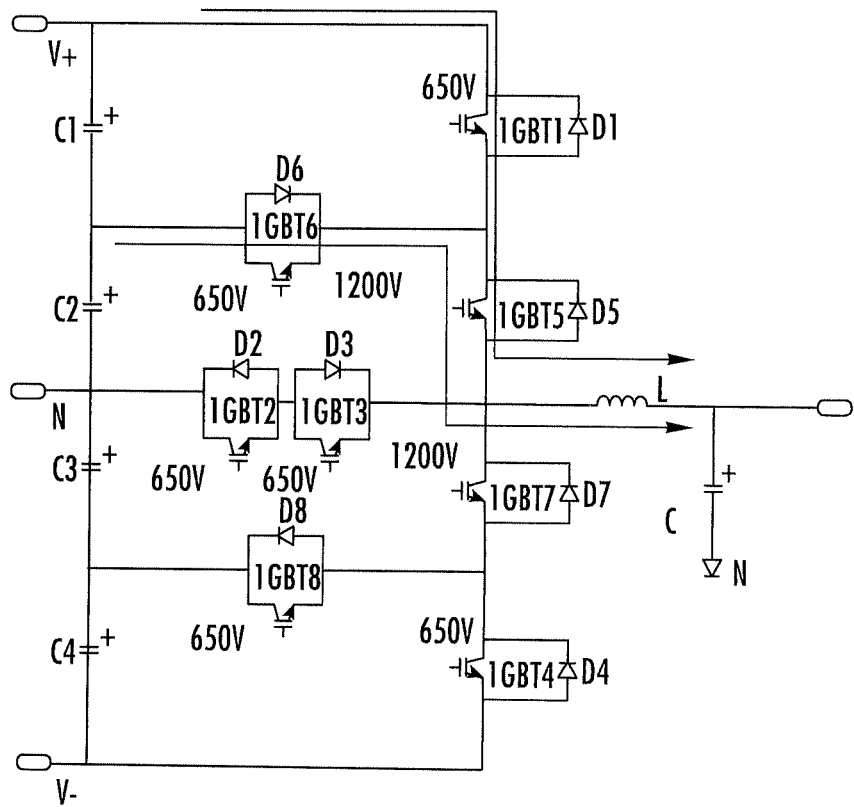

FIGS. 11-15 illustrate operational modes of the converter of FIG. 4 for various portions of an AC voltage waveform at the AC node A. Referring to FIGS. 11 and 12, in a first operational region 1110 when the AC voltage is rising but below a positive threshold level, transistors IGBT5, IGBT2 of the second and fifth switch branches are modulated (e.g., pulse-width modulated at a relatively high frequency in relation to the frequency of the AC voltage) to conduct current therethrough. In this mode, the diode D6 connected across the transistor IGBT6 conducts in concert with the transistor IGBT5 and the diode D3 connected across the transistor IGBT3 conducts in concert with the transistor IGBT2. Referring to FIGS. 11 and 13, in a second operational region 1120 when the AC voltage has risen above the first threshold, the transistor IGBT1 of the first switch branch is modulated while the transistor IGBT5 of the second switch branch is on. In this mode, the diode D6 conducts in conjunction with operation of the IGBT5. In a third operational region 1130 when the voltage is again below the positive threshold level, the transistors IGBT5, IGBT2 of the second and fifth switch branches are again operated as in the first operational region 1110.

Figure 14:
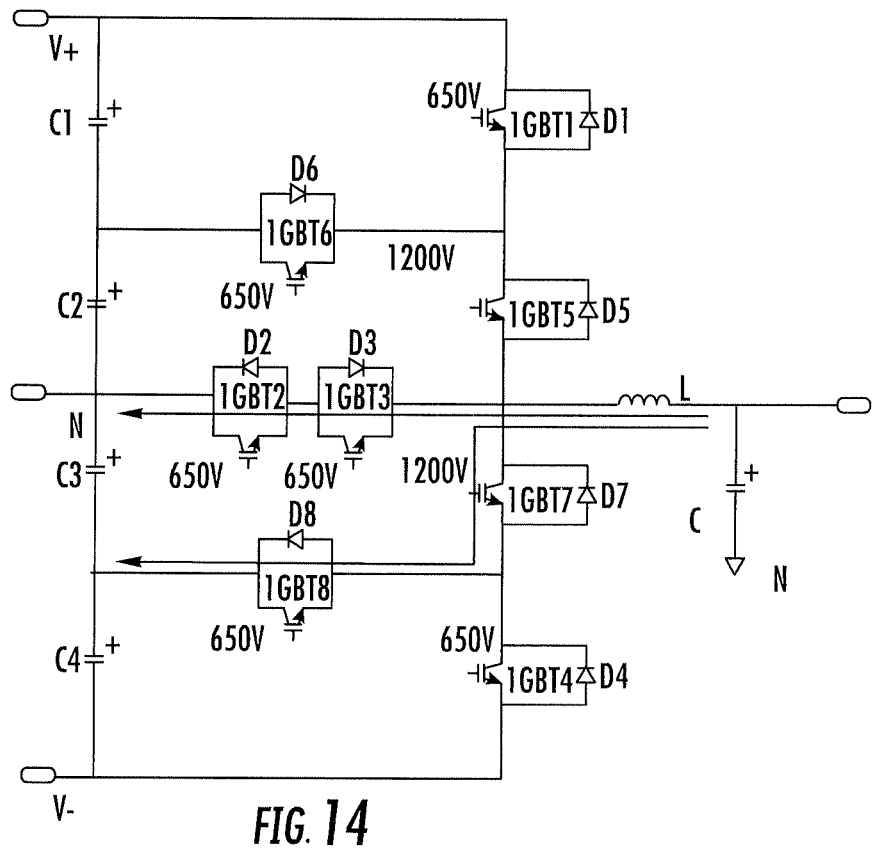
Figure 15:
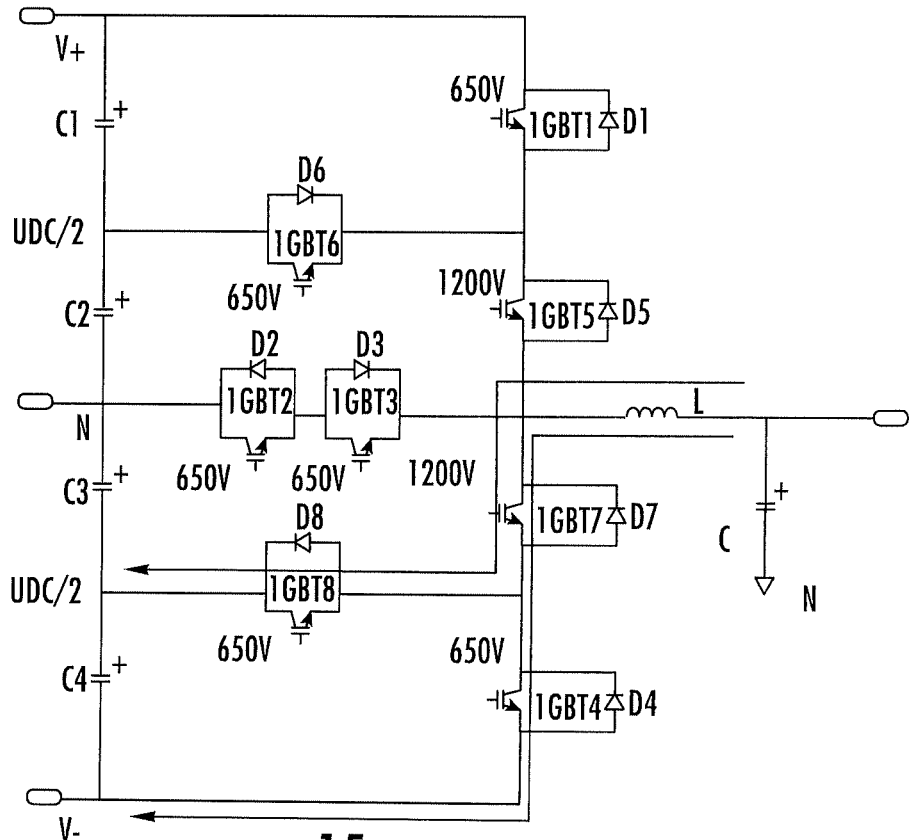

Referring to FIGS. 11 and 14, in a fourth operational region 1140 wherein the AC voltage is negative and is above a negative threshold, transistors IGBT3, IGBT7 of the fifth and third switch branches are modulated. In this mode, the diode D2 connected across the transistor IGBT2 conducts in concert with the transistor IGBT3, and the diode D8 connected across the transistor IGBT8 conducts in concert with the transistor IGBT7. Referring to FIGS. 11 and 15, in a fifth operational region 1150 in which the voltage falls below the negative threshold, the transistor IGBT4 of the fourth switch branch is modulated while the transistor IGBT7 of the third switch branch is on. In this mode, the diode D8 conducts in concert with the transistor IGBT4. In a sixth operational region 1160 when the voltage increases above the negative threshold, the transistors IGBT3, IGBT7 of the fifth and third switch branches are again operated as in the fourth operational region 1140.

Figure 16:
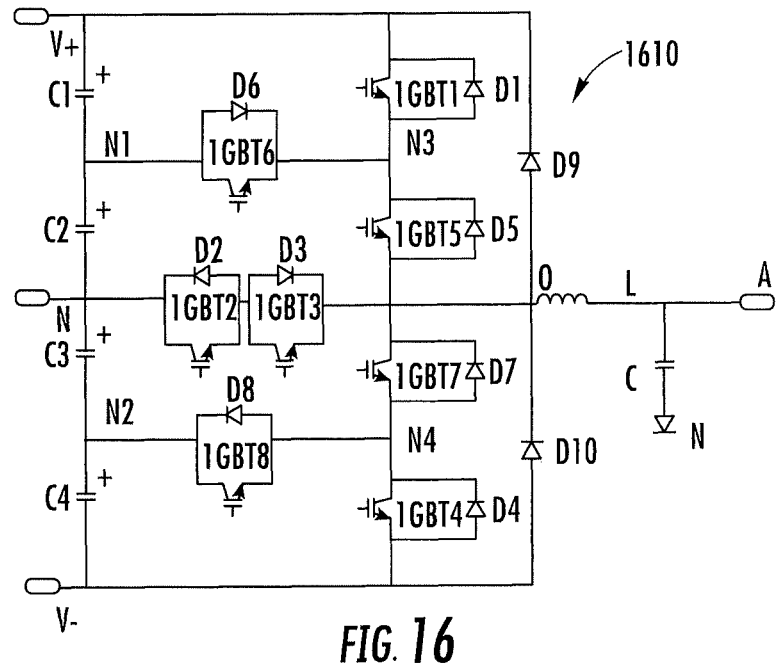
FIG. 16 is a schematic diagram illustrating a 5-level converter along the lines of FIG. 10 with additional diode branches.

The multi-level converter arrangements described above may be further modified according to further embodiments. For example, FIG. 16 illustrates a switching circuit 1610 similar to the switching circuit 1010 of FIG. 10, except for the addition of diodes D9, D10 that couple respective one of the positive and negative voltage buses V+, V− to the input/output node O. The diodes D9, D10 can reduce conduction losses for quadrant 2 and 4 operation of the converter.

Figure 17:
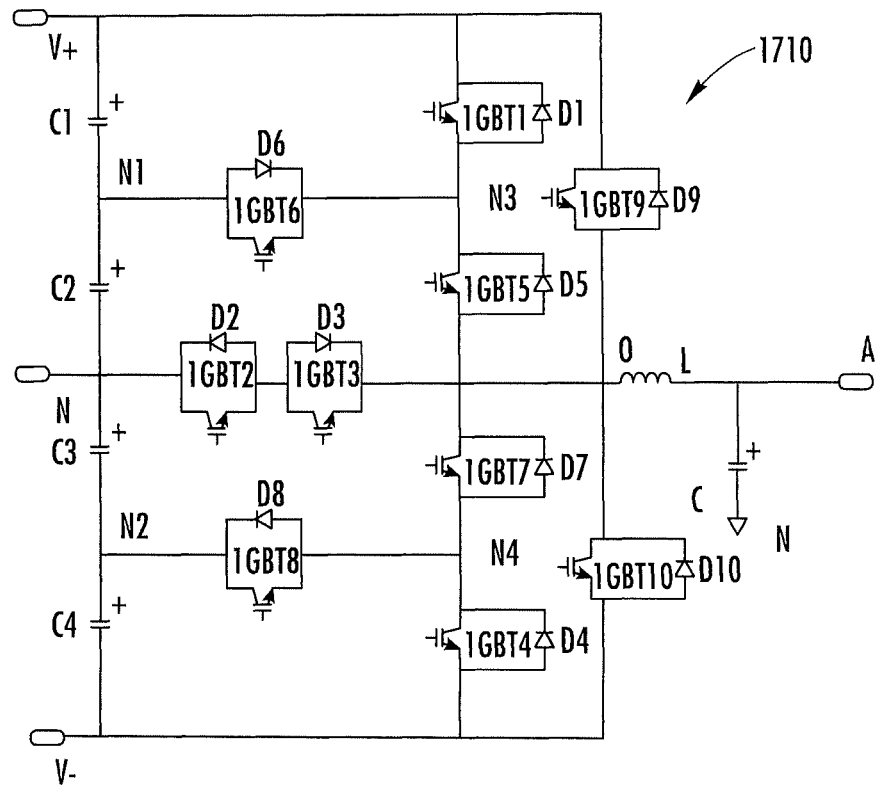
FIG. 17 is a schematic diagram illustrating a 5-level converter along the lines of FIG. 10 with additional switch branches.

FIG. 17 shows switching circuit 1710 that is a modification of the switching circuit 1010 of FIG. 10 wherein respective transistors IBGT9, IGBT10 with respective diodes D9, D10 are added between respective ones of the positive and negative voltage buses V+, V− and the input/output node O. This configuration can reduce conduction losses in all four quadrants of converter operation, as these devices can be modulated for higher voltage magnitudes, thus conducting current through a single device.

Figure 18:
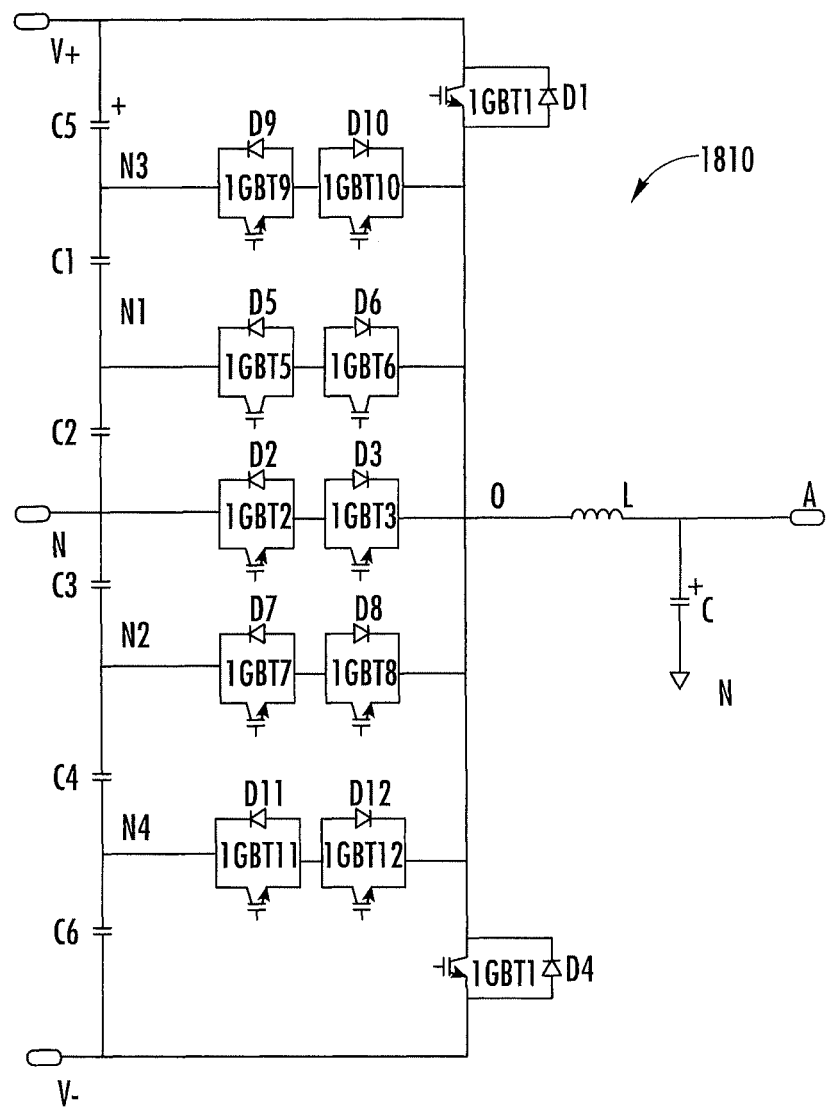
FIG. 18 is a schematic diagram illustrating a 7-level converter according to some embodiments.

According to further aspects, the switching circuit architectures illustrated in FIGS. 4 and 10 can be extended for higher-order multi-level inverters. For example, FIG. 18 illustrates a switching circuit 1810 for a 7-level converter that represents and modification of the circuit topology of FIG. 4 including additional capacitors C5, C6 and the switching circuit 1810 further including sixth and seventh switch branches with transistors IGBT9, IGBT10 and IGBT11, IGBT12 and associated diodes D9, D10, D11, D12 coupled between respective intermediate nodes N3, N4 and the input/output node O. It will be appreciated that this arrangement may be operated in a manner similar to that of the converter of FIG. 4, e.g., selected different groups of the transistors may be modulated for different AC voltage levels.

Figure 19:
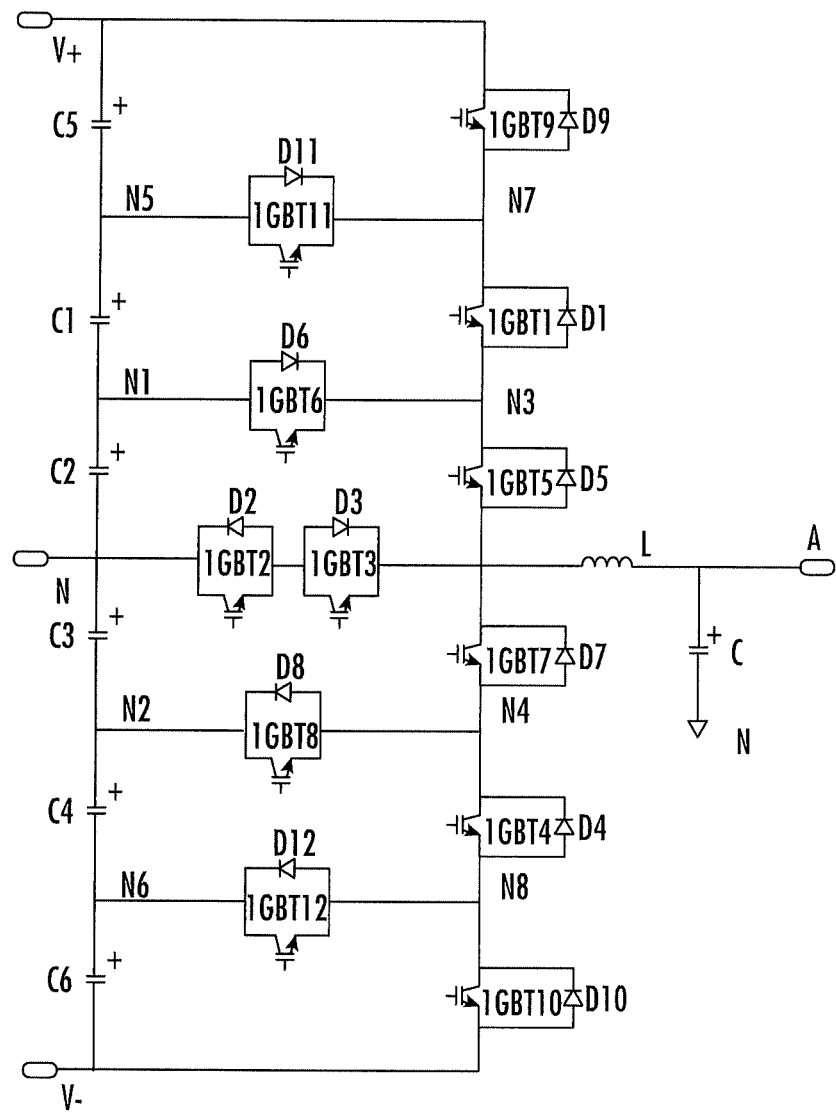
FIG. 19 is a schematic diagram illustrating a 7-level converter according to further embodiments.

FIG. 19 illustrates a switching circuit 1910 for a 7-level converter that represents a modification of the circuit topology of FIG. 10, with additional capacitors C5, C6, and the switching circuit 1910 further including an eighth switch branch including a transistor IGBT9 and associated diode D9, a ninth switching branch including a transistor IGBT10 and associated diode D10, a tenth switching branch including a transistor IGBT11 and associated diode D11, and an eleventh switch branch including a transistor IBT12 and associated diode D12. It will be appreciated that this arrangement may be operated in a manner similar to that of the converter of FIG. 10, e.g., selected different groups of the transistors may be modulated for different AC voltage levels.

Figure 20:
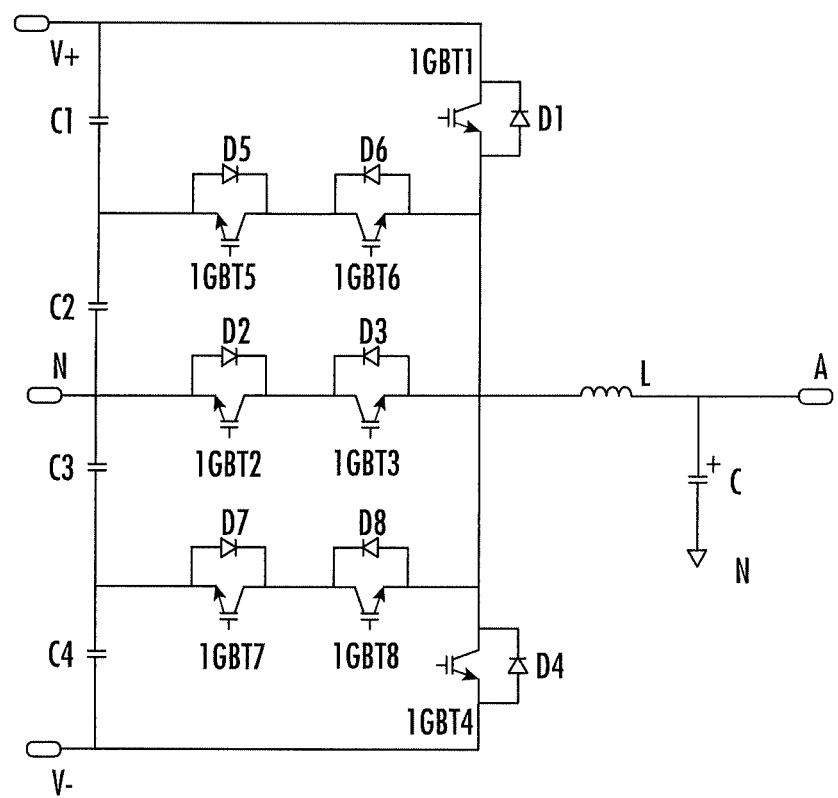
FIG. 20 is a schematic diagram illustrating a 5-level converter according to some embodiments.
Figure 21:
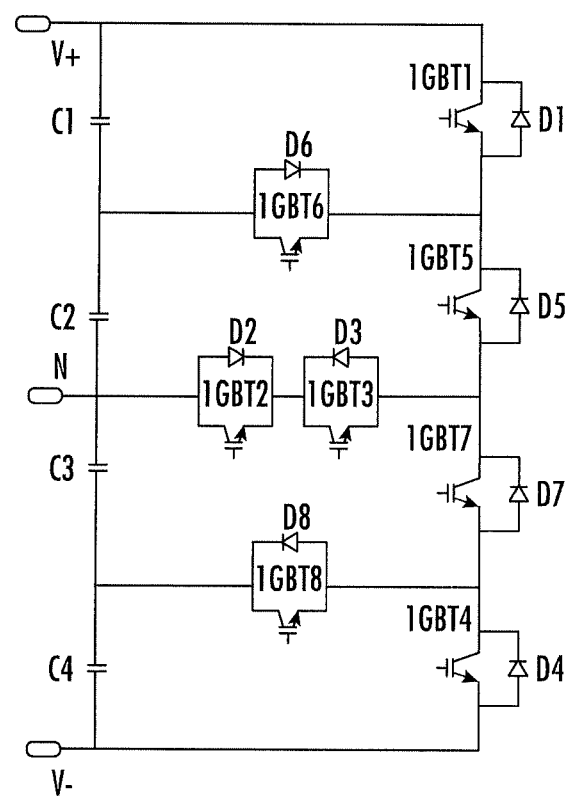
FIG. 21 is a schematic diagram illustrating a 5-level converter according to further embodiments.
Figure 22:
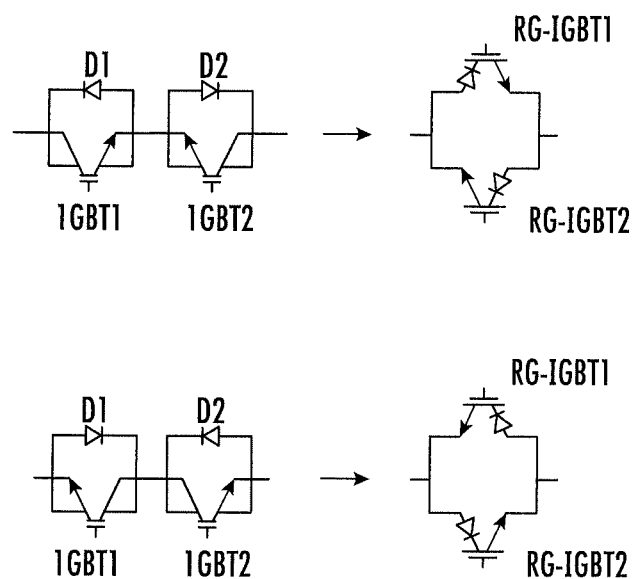
FIG. 22 is a schematic diagram illustrating how serial IGBTs may be replaced with a reverse blocking IGBT in some embodiments.

It will be appreciated that some embodiments of the inventive subject matter may include variations of circuitry described above, such as circuitry that uses different arrangements of transistors while providing similar functionality. For example, FIG. 20 illustrates a variation of the circuit of FIG. 4, a common emitter configuration wherein diodes D2, D3, D5, D6, D7, D8 are rearranged. FIG. 21 illustrates a similar variation of the circuit of FIG. 10. In some embodiments, serially-connected IGBTs IGBT1, IGBT2 and associated diodes D1, D2 (such as transistors IGBT5, IGBT5 and parallel connected diodes D5, D6 shown in FIG. 4), may be replaced by parallel-connected reverse blocking IGBTs RG-IGBT1, RG-IGBT2.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A multi-level converter comprising:
   a plurality of capacitors coupled in series between first and second nodes of a DC port and coupled to one another at intermediate nodes; and
   a switching circuit comprising:
      a first switch branch coupled between the first node of the DC port and an input/output node;
      a second switch branch coupled between the second node of the DC port and the input/output node;
      a third switch branch coupled between a first one of the intermediate nodes and the input/output node;
      a fourth switch branch coupled between a second one of the intermediate nodes and the input/output node; and
      a fifth switch branch coupled between a third one of the intermediate nodes and the input/output node,
   wherein the third, fourth and fifth switch branches each comprise at least two transistors coupled in series, wherein the first and second switch branches each comprise a single transistor, wherein the transistors of the fourth and fifth switch branches have a first voltage rating greater than a second voltage rating of the transistors of the third switch branch, and wherein the transistors of the first and second switch branches have the first voltage rating.

2. The multi-level converter of claim 1, wherein the transistors of the first, second, third, fourth and fifth switch branches comprise transistors having respective diodes coupled in parallel therewith.

3. The multi-level converter of claim 1, further comprising:
   a sixth switch branch coupled between a fourth one of the intermediate nodes and the input/output node; and
   a seventh switch branch coupled between a fifth one of the intermediate nodes and the input/output node.

4. The multi-level converter of claim 1, further comprising an inductor coupled to the input/output node.

* * * * *